Nov. 22, 1949  W. J. MILLER  2,489,043
PASTEURIZING AND COOLING APPARATUS
Filed June 30, 1947  3 Sheets-Sheet 2

INVENTOR.
William J. Miller,
BY Victor J. Evans & Co.
ATTORNEYS

Nov. 22, 1949 W. J. MILLER 2,489,043
PASTEURIZING AND COOLING APPARATUS
Filed June 30, 1947 3 Sheets—Sheet 3
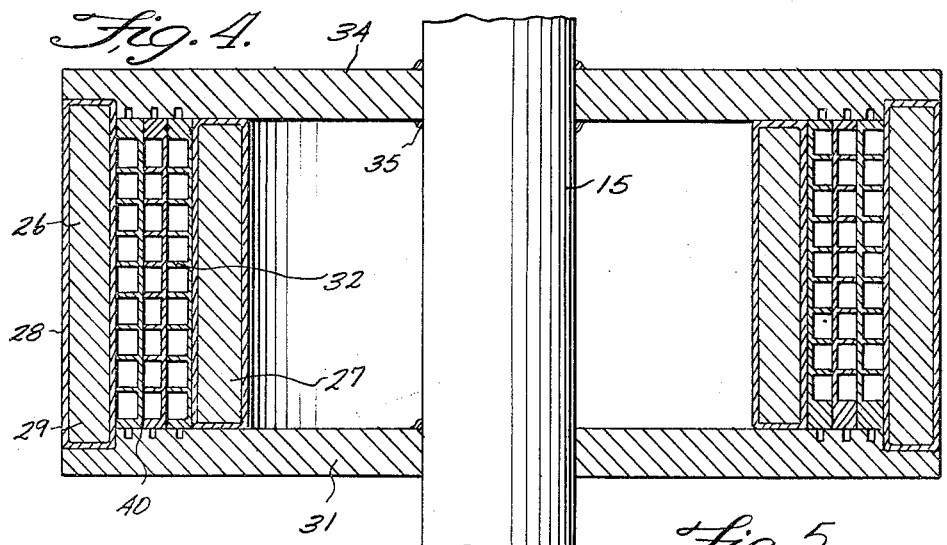
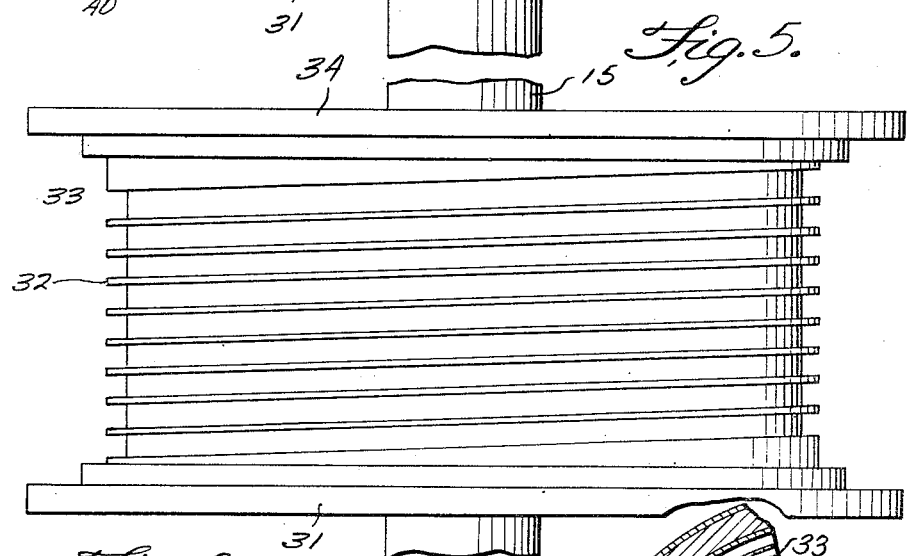
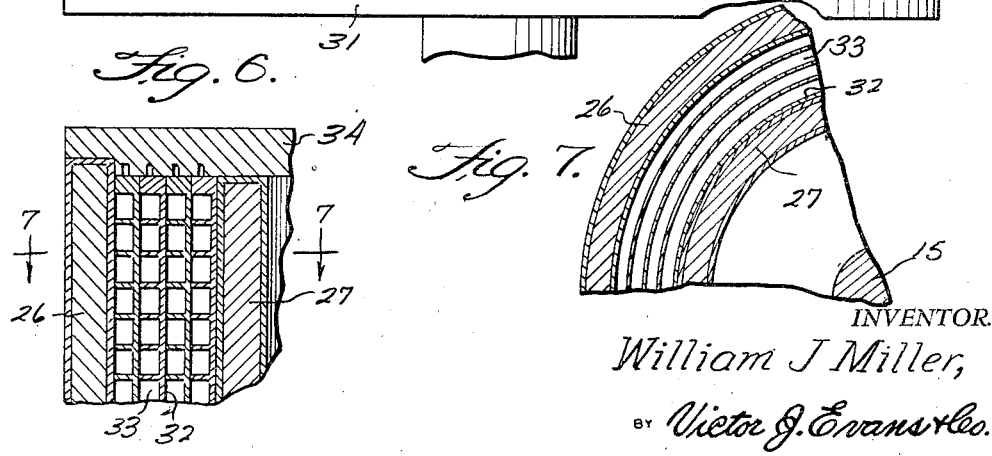
INVENTOR.
William J Miller,
BY Victor J. Evans & Co.
ATTORNEYS Patented Nov. 22, 1949

2,489,043

UNITED STATES PATENT OFFICE 2,489,043

PASTEURIZING AND COOLING APPARATUS

William J. Miller, Spring Grove, Pa.

Application June 30, 1947, Serial No. 758,132

2 Claims. (Cl. 257—245)

1

This invention relates to pasteurizing equipment.

It is an object of the present invention to provide pasteurizing equipment which is of simple construction, consumes little floor space, adapted for use in small dairies, inexpensive to manufacture and efficient in operation.

Another object of the invention is to provide pasteurizing equipment which can be easily and quickly assembled and disassembled for the purpose of being cleaned and which is made in sections which can be enlarged upon by the addition of other sections.

For other objects and for a better understanding of the invention, reference may be had to the following detailed description taken in connection with the accompanying drawing, in which Fig. 1 is a side elevational view of the pasteurizing equipment assembled upon a pedestal arrangement and showing the fluid supply pipe for the milk or fluid to be pasteurized, the steam and the brine used for finally cooling the milk after it has been heated.

Fig. 4 is a cross-sectional view, in elevation, taken on line 4—4 of Fig. 3.

Fig. 5 is a side elevational view of one of the spiral columns and of its supporting structure.

Fig. 6 is a fragmentary cross-sectional view taken through the heating and cooling unit.

Fig. 7 is a fragmentary view, in section, taken generally on line 7—7 of Fig. 6.

Figure 1:
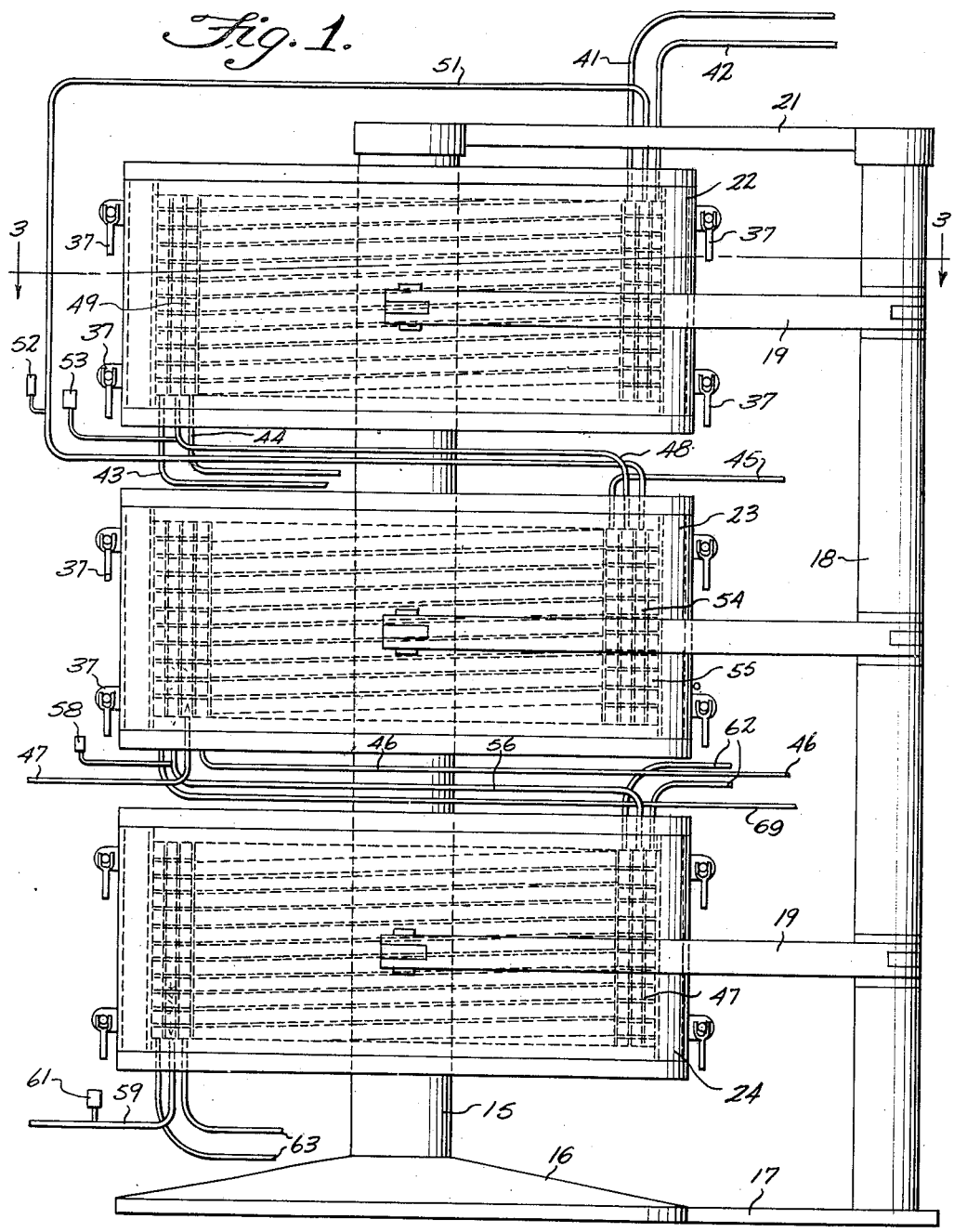
Figure 2:
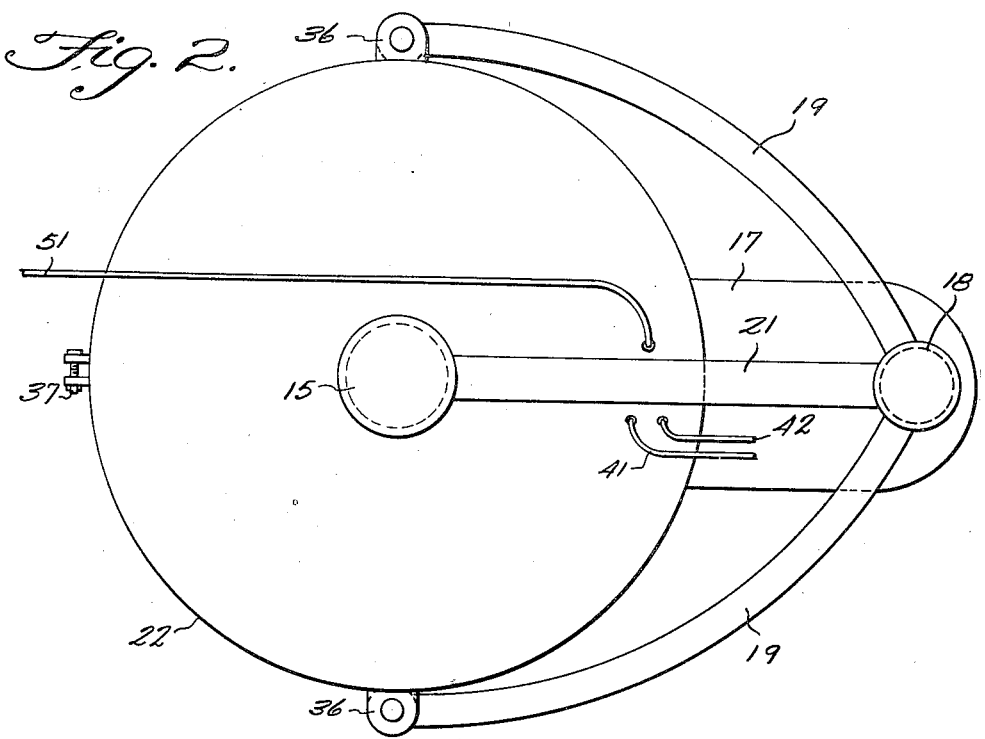
Fig. 2 is a top plan view of the arrangement.
Figure 3:
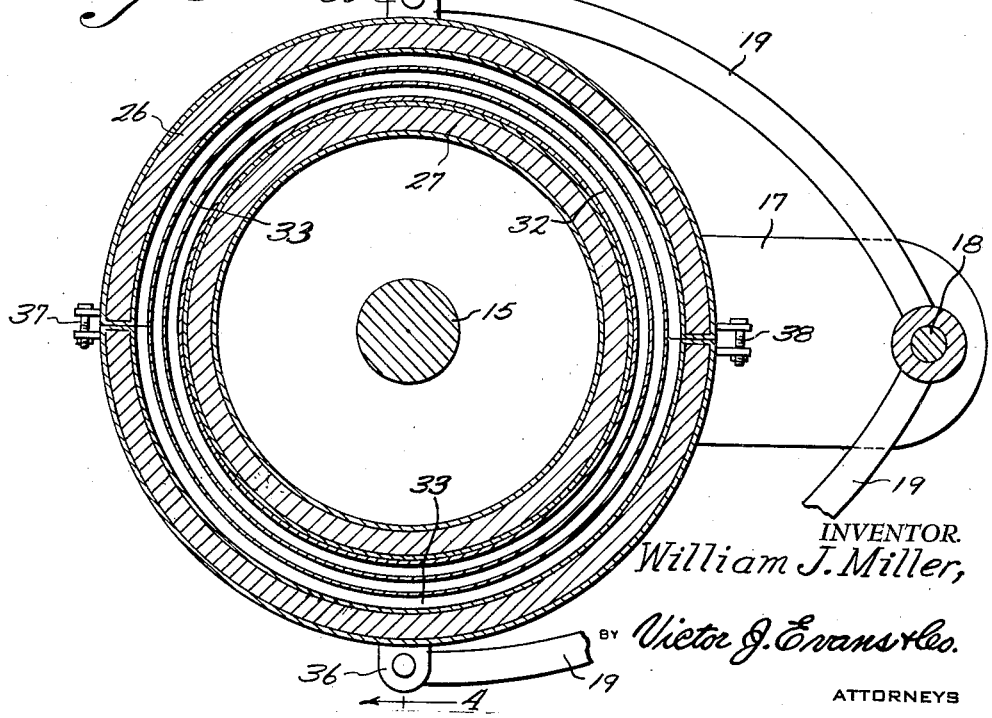
Fig. 3 is a transverse cross-sectional view taken through the top section and on line 3—3 of Fig. 1.

Referring now to the figures, 15 represents a pedestal having a base 16 and a lateral projection 17 thereon from which there extends upwardly a post 18 having laterally extending U-shaped brackets 19 vertically spaced from one another. At the top of the pedestal 15 is a tie member 21 extending to the top of the post 18.

On each bracket 19 there is mounted a heat exchange unit. On the top bracket 19 is a unit adapted to receive milk and steam. On the intermediate bracket 19 there is a unit adapted to receive steam, milk and brine. On the bottom bracket is a unit adapted to receive milk and brine. These units are numbered from top to bottom as 22, 23 and 24.

Referring now particularly to Figs. 3, 4, 5, 6 and 7, the detail construction of the several units will be described. Each unit has a pair of concentric rings 27 and 26 preferably of metal casing 28 and an insulating filler 29. These rings are supported upon a disc or plate 31 and between

2 them are a plurality of heat exchanging elements 32 which are concentric and arranged with one adjacent the outer ring 26 and the other adjacent the inner ring 27 and still other elements disposed therebetween. These elements have a spiral channel 33 extending from the bottom to the top whereby fluid in passing through the element will pass about it in a circuitous path. The top of the elements and the rings are retained by a cover plate 34. The plates 31 and 34 of each unit may be secured as by soldering indicated at 35 to the pedestal 15 or each unit may be retained against displacement on the pedestal by the brackets 19. The ends of the brackets 19 engage with lugs 36 on the exterior of the outer ring 26 and at the diametrically opposite sides thereof. The outer ring 26 is formed in half sections as viewed in Fig. 3 which are held together by fastening screws 37 and 38 extending through lug projections at opposite sides of the unit. In such cases the brackets 19 will have its arms so that they can be hinged laterally outwardly to separate the sections from the pedestal and to open the section into paths. Each arm is accordingly hinged upon the post 18. The head exchange elements are assembled one within the other and are sealed by a packing ring 40 between each of the elements 32.

Referring now particularly to Fig. 1, the passage of the steam, the milk and the brine will be traced. Steam enters the two heat exchange elements in the top section 22 from steam pipes 41 and 42. This steam leaves through pipes 43 and 44. A single steam pipe 45 enters the unit 23 to deliver the steam to the inner heat exchange element and leaves through a single pipe 46. The steam in the unit 23 will preheat the milk before it passes to the unit 22 to be finally heated. Milk enters the pipe 47 and passes upwardly through the heat exchange element adjacent the steam element and then outwardly through pipe 48 to the central heat exchange element 49 within the unit 22 whereby it will pass upwardly through the same and finally out through the top at 51. A thermometer 52 on the pipe 51 will indicate the temperature of the milk leaving the unit 22. A thermometer 53 on the pipe 48 will indicate the temperature of the milk entering the unit 22. Within this unit 22 the milk will be thoroughly pasteurized. The milk is conducted through pipe 51 to a heat exchange unit 54 adjacent the external heat exchange unit 55 which by pipe 69 is supplied with brine to precool the milk before entering the unit 24 to be finally cooled. The milk leaving the unit 22 passes through pipe 56 to a central heat exchange unit 57 in the unit 24. The temperature of the milk entering the unit 24 and leaving the unit 23 is indicated on the thermometer 58. Milk leaves unit 24 through a pipe 59 and its temperature is indicated by thermometer 61. Brine enters the unit 24 through pipe 62 and leaves through pipe 63. The brine heat exchange elements are located upon opposite sides of the central milk exchange elements 47 whereby to thoroughly and finally cool the milk.

I claim:

1. Pasteurizing equipment comprising a plurality of heat exchange units, some of which are adapted to receive steam and a liquid to be pasteurized, some of which are adapted to receive brine and a liquid to be pasteurized, and the others of which are adapted to receive steam, a liquid to be pasteurized, and cooling brine, each of said heat exchange units comprising concentric inner and outer insulated rings, heat exchange elements disposed between the rings, each heat exchange element having a spiral channel therein for causing the fluid passing through to have a circuitous path, said heat exchange elements being arranged concentric with one another whereby to seal off the channel passages, individual inlets and outlets for the several heat exchange elements, and said heat outer insulated ring being divided into halves, a post extending upwardly from the base, and bracket arms extending to each of the halves and adapted to be hinged apart whereby to separate the halves or bring them into engagement with one another, and fastener means for tightly securing the halves together.

2. Pasteurizing equipment as defined in claim 1, and said base having a pedestal extending upwardly therefrom through the heat exchange units, said heat exchange units having respectively top and bottom plates between which the halves are extended and means for connecting the top and bottom plates to the pedestal in vertically spaced relationship thereupon.

WILLIAM J. MILLER.

REFERENCES CITED

The following references are of record in the file of this patent:

UNITED STATES PATENTS

| Number | Name | Date |
|---|---|---|
| 878,225 | Miller | Feb. 4, 1908 |
| 1,609,971 | Seligman | Dec. 7, 1926 |
| 2,165,094 | Fette | July 4, 1939 |